United States Patent
Hall et al.

(10) Patent No.: US 7,246,186 B2
(45) Date of Patent: Jul. 17, 2007

(54) MOBIUS TIME-TRIGGERED COMMUNICATION

(75) Inventors: Brendan Hall, Eden Prairie, MN (US); Kevin Driscoll, Maple Grove, MN (US); Kelly Dean Morrell, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 235 days.

(21) Appl. No.: 10/993,923

(22) Filed: Nov. 19, 2004

(65) Prior Publication Data

US 2005/0132105 A1 Jun. 16, 2005

Related U.S. Application Data

(60) Provisional application No. 60/523,786, filed on Nov. 19, 2003.

(51) Int. Cl.
*G06F 13/00* (2006.01)
*G06F 3/00* (2006.01)
*H04L 29/08* (2006.01)
*G06F 9/44* (2006.01)

(52) U.S. Cl. ........................ 710/124; 710/36; 710/100; 710/305; 709/225; 370/337; 713/400; 713/500; 714/100

(58) Field of Classification Search ................ 710/36, 710/61, 62, 100, 107, 124, 127, 305, 313, 710/200; 709/218, 225, 226, 232, 250, 253, 709/248, 249; 370/280, 337, 351, 464, 503; 712/38, 32; 713/400, 500, 501; 714/3, 100; 700/90; 711/100; 719/328, 321; 361/679, 361/683, 748

See application file for complete search history.

(56) References Cited

U.S. PATENT DOCUMENTS

| 5,307,409 A | 4/1994 | Driscoll |
| 5,386,424 A | 1/1995 | Driscoll et al. |
| 6,052,753 A | 4/2000 | Doerenberg et al. |
| 6,226,676 B1 * | 5/2001 | Crump et al. ................ 709/227 |

(Continued)

FOREIGN PATENT DOCUMENTS

EP 1 280 312 A2 1/2003

(Continued)

OTHER PUBLICATIONS

"A single-chip universal cable set-top box/modem transceiver" by D'Luna et al. (abstract only) Publication Date: Nov. 1999.*

(Continued)

*Primary Examiner*—Gopal C. Ray
(74) *Attorney, Agent, or Firm*—Jon M. Powers; Fogg & Powers LLC (57) ABSTRACT

In one embodiment, a node comprises a first network interface and a second network interface. The node further comprises a first bus guardian that asserts a first bus guardian signal when the second network interface is allowed to transmit and a second bus guardian that asserts a second bus guardian signal when the first network interface is allowed to transmit. The first network interface is not allowed to transmit unless the second bus guardian asserts the second bus guardian signal. The second network interface is not allowed to transmit unless the first bus guardian asserts the first bus guardian signal.

20 Claims, 5 Drawing Sheets

U.S. PATENT DOCUMENTS

| | | |
|---|---|---|
| 6,374,078 B1 * | 4/2002 | Williams et al. ............... 455/7 |
| 6,618,359 B1 * | 9/2003 | Chen et al. ................. 370/242 |
| 6,707,913 B1 * | 3/2004 | Harrison et al. ....... 379/413.02 |
| 6,760,768 B2 * | 7/2004 | Holden et al. .............. 709/227 |
| 6,842,617 B2 * | 1/2005 | Williams et al. ........... 455/444 |
| 6,925,497 B1 * | 8/2005 | Vetrivelkumaran et al. . 709/225 |
| 6,956,461 B2 * | 10/2005 | Yoon et al. ............ 340/310.11 |
| 7,050,395 B1 * | 5/2006 | Chow et al. ................ 370/231 |
| 7,085,560 B2 * | 8/2006 | Petermann ............... 455/422.1 |
| 7,088,921 B1 * | 8/2006 | Wood .......................... 398/67 |
| 2005/0132105 A1 * | 6/2005 | Hall et al. .................... 710/36 |

FOREIGN PATENT DOCUMENTS

| | | |
|---|---|---|
| EP | 1 398 710 A2 | 3/2004 |
| WO | WO 00/64122 A1 | 10/2000 |

OTHER PUBLICATIONS

"Internet Content Adaptation (ICAP)," International Conference on Antennas and Propagation, XX, XX, Jul. 30, 2001, pp. 1-13, XP002226584, pp. 6-10: 3. ICAP architecture.

Tomlinson et al., "Extensible Proxy Services Framework," Internet Draft, [Online] Jul. 13, 2000, XP0002282310, Retrieved from the Internet: URL: http//standards.nortelnetworks.com/op es/non-wg-doc/draft-tomlinson-epsfw-00.txt, 3. Problem Description and Goals, 4. Architecture.

Hoyme K. et al.: "SAFEbus", Proceedings of the Digital Avionics Systems Conference. Seattle, Oct. 5-8, 1992, New York; IEEE, US, vol. Conf. 11, Oct. 5, 1992, pp. 68-73, XP0106690 ISBN: 0-7803-0820-4.

* cited by examiner

MOBIUS TIME-TRIGGERED COMMUNICATION

CROSS REFERENCE TO RELATED APPLICATIONS

This application is related to and claims the benefit of the filing date of U.S. Provisional Application No. 60/523,786, filed on Nov. 19, 2003, which is incorporated herein by reference.

TECHNICAL FIELD

The following description relates to communication systems in general and to distributed, fault-tolerant communication systems in particular.

BACKGROUND

Distributed, fault-tolerant communication systems are used, for example, in applications where a failure could possibly result in injury or death to one or more persons. Such applications are referred to here as "safety-critical applications." One example of a safety-critical application is a system that is used to monitor and manage sensors and actuators included in an airplane or other vehicle. Examples of protocols that are used to implement such fault-tolerant communication systems include time-triggered protocols (such the TTP/C, TTP/A, and FLEXRAY protocols) and the SAFEBUS protocol.

It is typically desirable to improve the integrity, reliability, and/or availability of such systems.

SUMMARY

In one embodiment, a node comprises a first network interface and a second network interface. The node further comprises a first bus guardian that asserts a first bus guardian signal when the second network interface is allowed to transmit and a second bus guardian that asserts a second bus guardian signal when the first network interface is allowed to transmit. The first network interface is not allowed to transmit unless the second bus guardian asserts the second bus guardian signal. The second network interface is not allowed to transmit unless the first bus guardian asserts the first bus guardian signal.

In another embodiment, a node communicates over a first channel, a second channel, a third channel, and a fourth channel. The node comprises a first network interface to receive first data from the first channel and second data from the second channel and a second network interface to receive third data from the third channel and fourth data from the fourth channel. The node performs at least one comparison of at least two of the first data, the second data, the third data, and the fourth data and evaluates at least one voting rule that is a function of the results of the at least one comparison.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
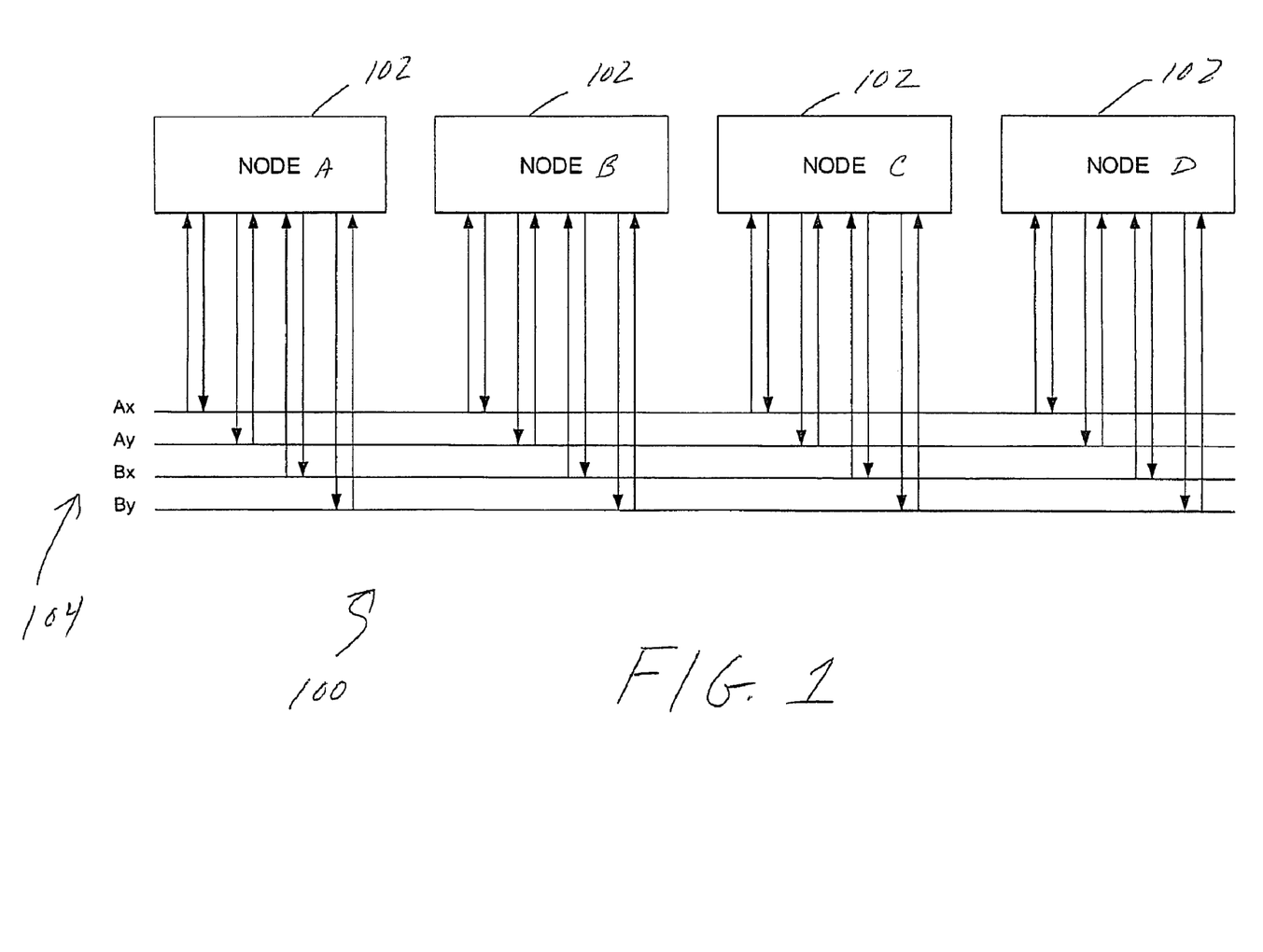
FIG. 1 is a block diagram of a communication network.

FIG. 1 is a block diagram of a communication network 100. The communication network 100 includes multiple nodes 102 that communicate with one another over multiple channels 104. In the particular embodiment shown in FIG. 1, four nodes 102 are shown (each of which is labeled node A, node B, node C, and node D, respectively). Also, in such an embodiment, the four nodes 102 communicate with one another over four channels 104. The four channels 104 are individually referred to here as "channel Ax", "channel Ay", "channel Bx", and "channel By", respectively. In other embodiments, the nodes 102 communicate over a different number of channels (for example, in one such other embodiment, the nodes 102 of the network communicate over two channels). In the particular embodiment shown in FIG. 1 and described here, the nodes 102 use a time division multiple access (TDMA) media access scheme. In one such implementation, a time-triggered protocol such as the TTP/C protocol or the FLEXRAY protocol are implemented. In other implementations, other TDMA protocols are implemented.

Figure 2:
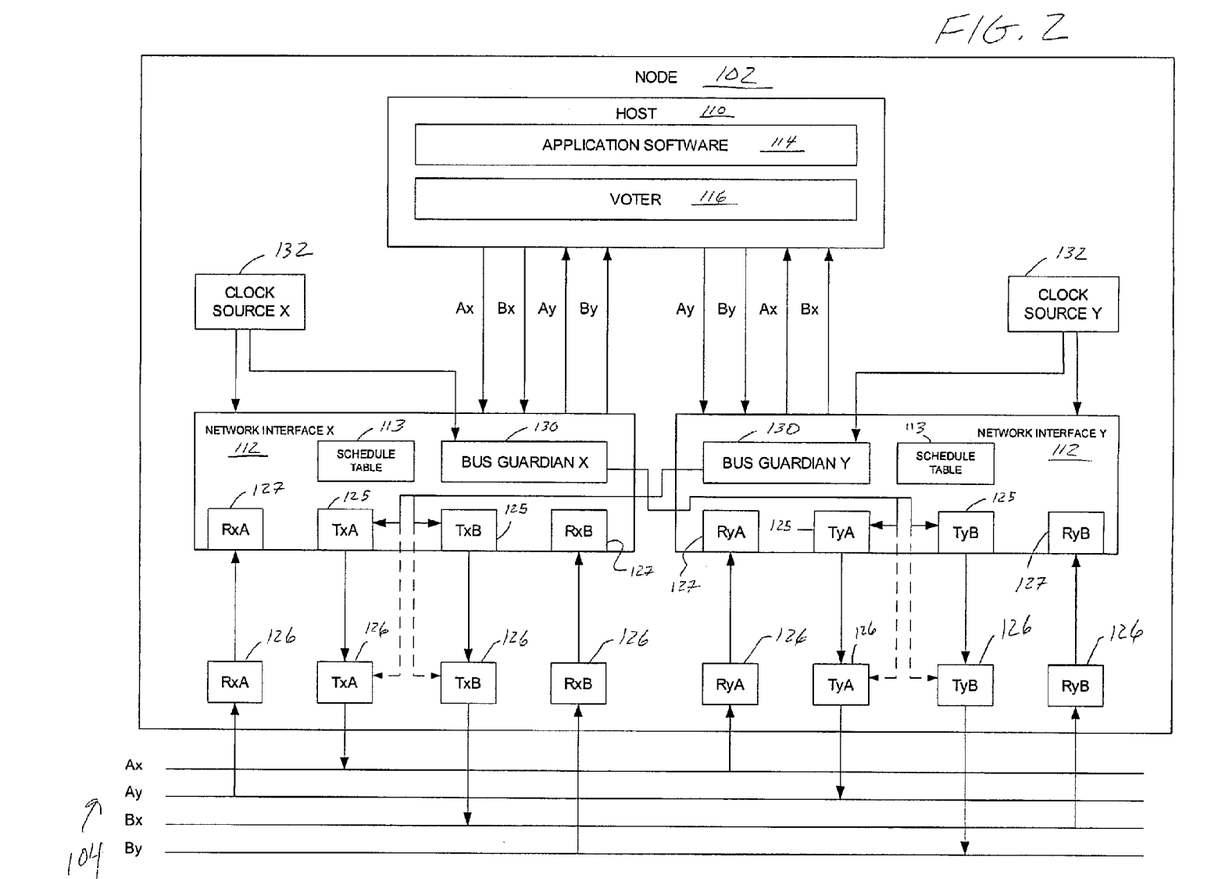
FIG. 2 is a block diagram of one embodiment of a node.

FIG. 2 is a block diagram of one embodiment of a node 102. Each node 102 includes a host 110 and a pair of network interfaces 112 (individually referred to here as "network interface X" and "network interface Y"). The host 110 executes application software 114 that provides the data that is communicated over the communication network 100. For example, in one implementation, the host 110 is a computer (or other programmable processor) executing a safety-critical control application. The host 110 communicates with the other nodes 102 in the communication network 100 using the network interfaces 112. The network interfaces 112, among other things, implement the specific protocol functionality required for the respective node 102 to communicate over the network 100. For example, in one embodiment, the network interfaces 112 implement the TDMA functionality that enables the node 102 to communicate over the network in accordance with a TDMA schedule.

In one implementation, network interface X is implemented in an integrated circuit designed to carry out the functionality described here as being performed by the network interface X and network interface Y is implemented in a separate integrated circuit designed to carry out the functionality described here as being performed by the network interface Y. In other embodiments, each of the network interfaces 112 are implemented in other ways (for example, using programmable processors or other programmable devices that are programmed to carry out the functionality described here as being performed by the respective network interfaces 112).

Each of the network interfaces 112 includes two transmit interfaces 125 and two receive interfaces 127. The transmit interfaces 125 of network interface X are labeled "TxA" and "TxB" respectively and the receive interfaces 127 of network interface X are labeled "RxA" and "RxB" respectively. The transmit interfaces 125 of network interface Y are labeled "TyA" and "TyB" respectively and the receive interfaces 127 of network interface Y are labeled "RyA" and "RyB" respectively.

The network interfaces 112 include multiple media drivers 126 that couple the transmit interfaces 125 and the receive interfaces 127 of the network interfaces 112 to the channels 104. The media drivers 126 are physical layers devices that are compatible with, and communicate with, the type of channels 104 that are used in the communication network 100. For example, in one embodiment, the channels 104 are implemented as linear buses and the media drivers 126 comprise suitable physical layer devices that transmit on or receive data from that type of linear bus. In other embodiments, where other types of channels 104 are used, other types of media drivers 126 are used.

In the embodiment shown in FIG. 2, eight media drivers 126 are used. A respective media driver 126 is coupled to each of the transmit interfaces 125 of each of the network interfaces 112. The media drivers 126 coupled to the transmit interfaces 125 are referred to here as "transmit" media drivers 126. In FIG. 2, the transmit media driver 126 coupled to the transmit interface TxA is labeled "TxA", the transmit media driver 126 coupled to the transmit interface TxB is labeled "TxB", the transmit media driver 126 coupled to the transmit interface TyA is labeled "TyA", and the transmit media driver 126 coupled to the transmit interface TyB is labeled "TyB." A respective media driver 126 is coupled to each of the receive interfaces 127 of each of the network interfaces 112. The media drivers 126 coupled to the receive interfaces 127 are referred to here as "receive" media drivers 126. In FIG. 1, the receive media driver 126 coupled to the receive interface RxA is labeled "RxA", the receive media driver 126 coupled to the receive interface RxB is labeled "RxB", the receive media driver 126 coupled to the receive interface RyA is labeled "RyA", and the receive media driver 126 coupled to the receive interface RyB is labeled "RyB".

The transmit interface TxA of network interface X is coupled to the respective receive interface RyA of network interface Y in each of the nodes 102 of the network 100 via channel Ax. This is done by coupling the transmit interface TxA to channel Ax via transmit media device TxA and coupling the receive interface RyA in each of the nodes 102 to channel Ax via receive media device RyA. Data output by the transmit interface TxA is transmitted over channel Ax by the transmit media device TxA and is received by the receive media device RyA in each of the nodes 102 from channel Ax. The received media device RyA provides the received data to the receive interface RyA of network interface Y in each of the nodes 102.

The transmit interface TxB of network interface X is coupled to the respective receive interface RyB of network interface Y in each of the nodes 102 of the network 100 via channel Bx. This is done by coupling the transmit interface TxB to channel Bx via transmit media device TxB and coupling the receive interface RyB in each of the nodes 102 to channel Bx via receive media device RyB. Data output by the transmit interface TxB is transmitted over channel Bx by the transmit media device TxB and is received by the receive media device RyB in each of the nodes 102 from channel Bx. The received media device RyB provides the received data to the receive interface RyB of network interface Y in each of the nodes 102.

The transmit interface TyA of network interface Y is coupled to the respective receive interface RxA of network interface X in each of the nodes 102 of the network 100 via channel Ay. This is done by coupling the transmit interface TyA to channel Ay via transmit media device TyA and coupling the receive interface RxA in each of the nodes 102 to channel Ay via receive media device RxA. Data output by the transmit interface TyA is transmitted over channel Ay by the transmit media device TyA and is received by the receive media device RxA in each of the nodes 102 from channel Ay. The received media device RxA provides the received data to the receive interface RxA of network interface X in each of the nodes 102.

The transmit interface TyB of network interface Y is coupled to the respective receive interface RxB of network interface X in each of the nodes 102 of the network 100 via channel By. This is done by coupling the transmit interface TyB to channel By via transmit media device TyB and coupling the receive interface RxB in each of the nodes 102 to channel By via receive media device RxB. Data output by the transmit interface TyB is transmitted over channel By by the transmit media device TyB and is received by the receive media device RxB in each of the nodes 102 from channel By. The received media device RxB provides the received data to the receive interface RxB of network interface X in each of the nodes 102.

A particular TDMA scheduled used in network 100 may, in one usage scenario, may indicate that network interface X of a particular node is scheduled to transmit during a different time slot than network interface Y of that same node 102. In another usage scenario, the TDMA schedule may indicate that both network interface X and network interface Y for a particular node 102 are scheduled to transmit during the same time slot. Also, for a given TDMA round, a node 102 may transmit the same data on network interfaces X and Y or transmit different data-on network interfaces X and Y.

Each of the network interfaces 112 are synchronized to a global time base for the network 100. In one embodiment, each of the network interfaces 112 is coupled to a respective clock source 132. The clock source 132 to which the network interface X is coupled is referred to here as "clock source X" and the clock source 132 to which the network interface Y is coupled is referred to here as "clock source Y." Each of the network interfaces 112 uses the respective clock source 132 and the data that the network interface 112 receives from the respective channels 104 (channels Ay and By in the case of network interface X and channels Ax and Bx in the case of network interface Y in the example shown in FIG. 2) to synchronize itself to the global time base for the network 100. For example, in one embodiment, each network interface 112 uses message arrival time of the received data to ascertain the difference between the clock source 132 used by that network interface and the global time base of the network 100. By cross-coupling the channels 104 as shown in FIG. 1 (that is, network interface X transmits on channels Ax and Bx and receives from channels Ay and By while network interface Y transmits on channels Ay and By and receives from channels Ax and Bx), cause the network interfaces 112 to be mutually synchronized to same global time base.

Each of the network interfaces 112 maintains a schedule table 113 (referred to individually herein as "schedule table X" and "schedule table Y", respectively) that incorporates a local instantiation of the TDMA communications sequencing table. The content of each schedule table 113 characterizes the data flow in relation to the TDMA communication sequence (that is, the order in which nodes transmit and the length of transmissions, when the BG enable signal generated by the respective bus guardian 130 is to be asserted, etc.). In one embodiment each schedule table 113 also contains attributes of the TDMA data flow, and may also include voting rules (restrictions) that may be applied to the data. For example if that data may be selected for availability or integrity in accordance with the rules of Table 1.

The network interfaces X and Y perform a fault tolerant clock synchronization which is used to increment a global clock counter that is used to sequence through the respective schedule table 113. The schedule tables 113 are largely the same as both network interfaces X and Y share a common communication sequence, and in operation both network interfaces X and Y mutually synchronize to a shared TDMA schedule.

Where network interface X and network interface Y are scheduled to transmit during the same time slot or slots, the schedules tables X and Y are identical. Where network interface X and network interface Y are scheduled to transmit during different time slots, the schedule tables X and Y, though largely the same, will differ with respect to the local data flow, BG enable signal, and voting requirements.

Each of the network interfaces 112 includes an integrated local bus guardian 130. The bus guardian 130 included in network interface X is referred to here as "bus guardian X" and the bus guardian 130 included in network interface Y is referred to here as "bus guardian Y". Bus guardian X generates a signal (referred to here as the "BG enable signal X" or "enable signal X") that is used to indicate when network interface Y is allowed to output data for transmission and bus guardian Y generates a signal (referred to here as the "BG enable signal Y" or "enable signal Y") that is used to indicate when network interface X is allowed to output data for transmission. The BG enable signal X defines a bus guardian window in which the transmit interfaces TyA and TyB of network interface Y are allowed to output data for transmission. The BG enable signal Y defines a bus guardian window in which the transmit interfaces TxA and TxB of network interface X are allowed to output data for transmission. In other words, network interface X is not allowed to transmit unless the BG enable signal Y is asserted and the network interface Y is not allowed to transmit unless the BG enable signal X is asserted.

In the embodiment shown in FIG. 2, bus guardian X generates the BG enable signal based on the schedule table X maintained by network interface X and the clock source X and bus guardian Y generates the BG enable signal based on the schedule table X maintained by network interface X and the clock source X.

In the embodiment shown in FIG. 2, network interface X and use the same clock source (clock source X) and network interface Y and bus guardian Y uses the same clock source (clock source Y). In another embodiment, network interfaces X and Y use the same clock source and the bus guardians X and Y use the same clock source.

By crossing-coupling the bus guardian X to network interface Y and cross-coupling the bus guardian Y to network interface X, the availability of the channels 104 can be improved.

When the network interface X determines based on schedule table X and the clock source X that it is supposed to transmit during the current time slot, network interface X outputs data for transmission on channels Ax and Bx to the transmit interfaces TxA and TxB, respectively. The transmit interfaces TxA and TxB do not forward the received data to the transmit media devices TxA and TxB, respectively, for transmission on channels Ax and Bx, respectively, unless the BG enable signal Y is asserted. Likewise, when the network interface Y determines based on schedule table Y and the clock source Y that it is supposed to transmit during the current time slot, network interface Y outputs data for transmission on channels Ay and By to the transmit interfaces TyA and TyB, respectively. The transmit interfaces TyA and TyB do not forward the received data to the transmit media devices TyA and TyB, respectively, for transmission on channels Ay and By, respectively, unless the BG enable signal X is asserted.

In an alternative embodiment (illustrated in FIG. 2 using dashed lines), the transmit media devices TxA and TxB are "enabled" by the BG enable signal X and the transmit media devices TyA and TyB are "enabled" by the BG enable signal Y. In such an embodiment, when the network interface X determines based on schedule table X that it is supposed to transmit during the current time slot, network interface X outputs data for transmission on channels Ax and Bx (via the transmit interfaces TxA and TxB, respectively) to the transmit media devices TxA and TxB, respectively. The transmit media devices TxA and TxB, however, do not transmit the received data on channels Ax and By, respectively, unless the BG enable signal Y is asserted by the bus guardian Y. Likewise, in such an embodiment, when the network interface Y determines based on schedule table Y that it is supposed to transmit during the current time slot, network interface y outputs data for transmission on channels Ay and By (via the transmit interfaces TyA and TyB, respectively) to the transmit media devices TyA and TyB, respectively. The transmit media devices TyA and TyB, however, do not transmit the received data on channels Ay and By, respectively, unless the BG enable signal X is asserted by the bus guardian X.

In the embodiment shown in FIG. 2, the node 102 further comprises a voter 116. The voter 116 is used to process data that the node 102 receives from a different transmitting node 102 in the network 102 when that transmitting node 102 transmits the same data via network interfaces X and Y (either during the same time slot or during different time slots). When such a transmitting node 102 is supposed to transmit the same data on network interfaces X and Y, the voter 116 compares the data received on the multiple channels in order to detect (and in some implementations, correct) errors in the data received on those channels in order to improve the reliability of the data received from the network 100. In such an embodiment, the voter 116 compares the data received on each of the channels Ax, Ay, Bx, and By to data received on one or more of the other channels Ax, Ay, Bx, and By and evaluates one or more voting rules that are a function of the results of the comparisons. Examples of such voting rules are illustrated in Table 1. The voter 116 performs such voting operations after the respective transmitting mode 102 has transmitted the data using both that node's network interface X and network interface Y (that is, after the single time slot assigned to the transmitting node 102 to transmit from both network interfaces X and Y during that same time slot or after the two separate time slots assigned to network interfaces X and Y, respectively, during which the network interfaces X and Y transmit separately).

In the particular embodiment shown in FIG. 2, the voter 116 is implemented on the host 110 (for example, as software executing on the same programmable processor that executes the application 114). In other embodiments, the voter 116 is implemented in other ways (for example, using a different type of programmable device and/or in hardware such as an application-specific integrated circuit).

In the embodiment shown in FIG. 2, the network interfaces X and Y communicate on four channels. In another embodiment, the network interfaces X and Y communicate on two channels (for example, channels Ax and By). In such an alternative embodiment, network interface X transmits on channel Ax and receives data from both channels Ax and By and network interface Y transmits on channel By and receives data from both channels Ax and By. In such an embodiment, the voting operation performed at the node 102, for example, compares the data received from the two channels Ax and By to determine if the received data is identical. If the data received on the two channels is identical, it is considered to have been received with integrity and if the data received on the two channels is not identical, it is not considered to have been received with integrity.

Figure 3:
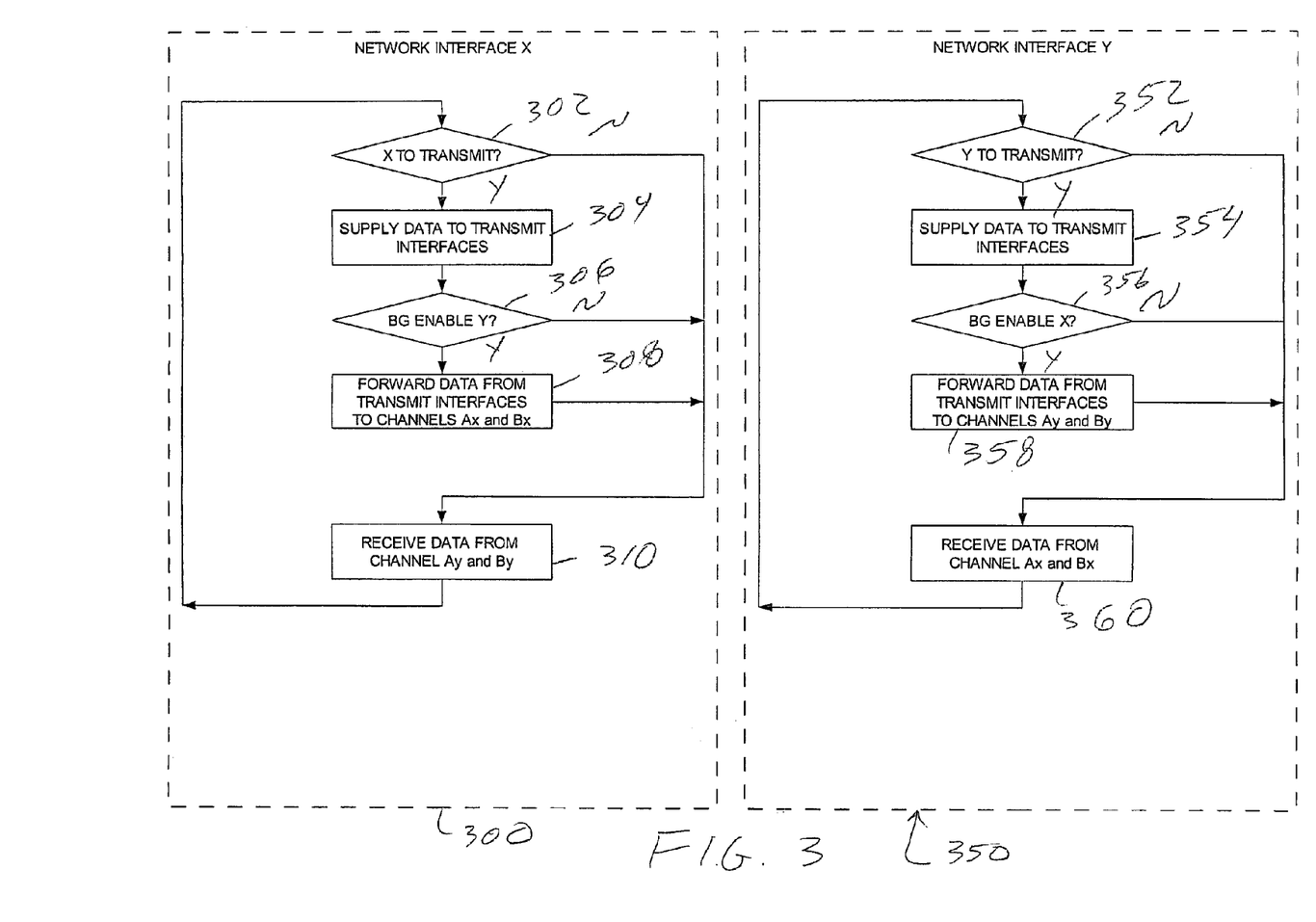
FIG. 3 is a flow diagram of one embodiment of methods of receiving and outputting data by the controllers of FIG. 2.

The operation of each node 102 is described in connection with FIGS. 3 through 5. FIG. 3 is a flow diagram of one embodiment of methods 300 and 350 of receiving and transmitting data by network interface X and network interface Y, respectively, in each node 102. Although the embodiments of methods 300 and 350 shown in FIG. 3 are described as being implemented in the communication network 100 of FIG. 1 and a node 102 of FIG. 2, it is to be understood that other embodiments of methods 300 and 350 are implemented in other ways. The method 300 is performed by network interface X and method 350 is performed by network interface Y. In the context of FIG. 3, the node 102 that is performing the processing of methods 300 and 350 is referred to here as the "current node."

When the network interface X determines based on schedule table X and the clock source X that it is supposed to transmit during the current time slot (checked in block 302), the network interface X supplies data for transmission on channels Ax and Bx to the transmit interfaces TxA and TxB, respectively (block 304). However, the transmit interfaces TxA and TxB forward the received data to the transmit media devices TxA and TxB, respectively (which in turn transmit the data on channels Ax and Bx, respectively) (block 308) only if the BG enable signal Y is asserted (block 306).

When the network interface X determines based on schedule table X and the clock source X that it is not supposed to transmit during the current time slot, network interface X receives data from the channels Ay and By (block 310). The network interface receives data from channel Ay at the receive interface RxA of network interface X and receives data from channel By at the receive interface RxB of network interface X. The received data is, for example, forwarded to the voter 116 for processing thereby. In one embodiment, the voter 116 processes the received data as described below in connection with FIG. 5.

When the network interface Y determines based on schedule table Y and the clock source Y that it is supposed to transmit during the current time slot (checked in block 352), the network interface Y supplies data for transmission on channels Ay and By to the transmit interfaces TyA and TyB, respectively (block 354). However, the transmit interfaces TyA and TyB forward the received data to the transmit media devices TyA and TyB, respectively (which in turn transmit the data on channels Ay and By, respectively) (block 358) only if the BG enable signal X is asserted (block 356).

When the network interface Y determines based on schedule table Y and the clock source Y that it is not supposed to transmit during the current time slot, network interface Y receives data from the channels Ax and Bx (block 360). The network interface Y receives data from channel Ax at the receive interface RyA of the network interface Y and receives data from channel Bx at the receive interface RyB of network interface Y. The received data is, for example, forwarded to the voter 116 for processing thereby. In one embodiment, the voter 116 processes the received data as described below in connection with FIG. 5.

Figure 4:
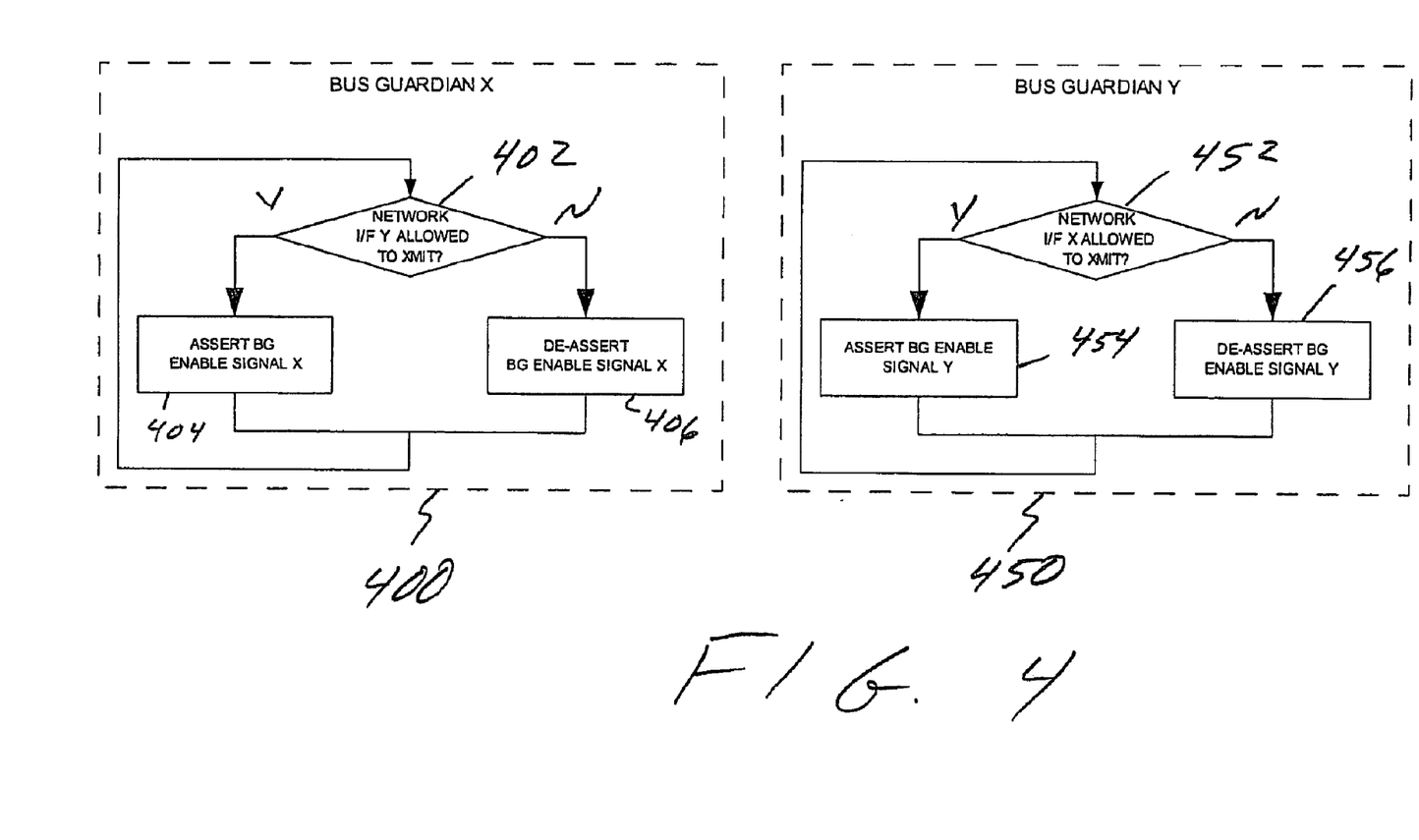
FIG. 4 is a flow diagram illustrating methods of generating the bus guardian enable signals.

FIG. 4 is a flow diagram illustrating methods 400 and 450 of generating the bus guardian enable signals X and Y, respectively. Although the embodiments of methods 400 and 450 shown in FIG. 4 are described as being implemented using the communication network 100 of FIG. 1 and the node 102 of FIG. 2, it is to be understood that other embodiments of methods 400 and 450 are implemented in other ways. Methods 400 and 450 are performed by bus guardians X and Y, respectively. In the context of FIG. 4, the node 102 that is performing the processing of methods 400 and 450 is referred to here as the "current node."

Generating the bus guardian enable signal X involves determining if, according to the particular media access scheme used in the network 100, the network interface Y is allowed to transmit at that particular time (checked in block 402). If this determination indicates that it is time to transmit, the bus guardian enable signal X is enabled (that is, asserted) (block 404). Otherwise, the bus guardian enable signal X is disabled (that is, de-asserted) (block 406). Bus guardian X, in determining when to assert the BG enable signal X, uses the global communication table maintained by network interface X and, in the embodiment shown in FIG. 2, the clock source X to determine when the network interface Y is allowed to transmit (and therefore, when the BG enable signal X should be asserted).

Method 450 is similar to method 400. Generating of the bus guardian enable signal Y involves determining if, according to the particular media access scheme used in the network 100, the network interface X is allowed to transmit at that particular time (checked in block 452). Bus guardian Y, in determining when to assert the BG enable signal Y, uses the global communication table maintained by network interface Y and, in the embodiment shown in FIG. 2, the clock source Y to determine when the network interface X is allowed to transmit (and therefore, when the BG enable signal Y should be asserted). If this determination indicates that it is time to transmit, the bus guardian enable signal Y is enabled (that is, asserted) (block 454). Otherwise, the bus guardian enable signal Y is disabled (that is, de-asserted) (block 456).

Figure 5:
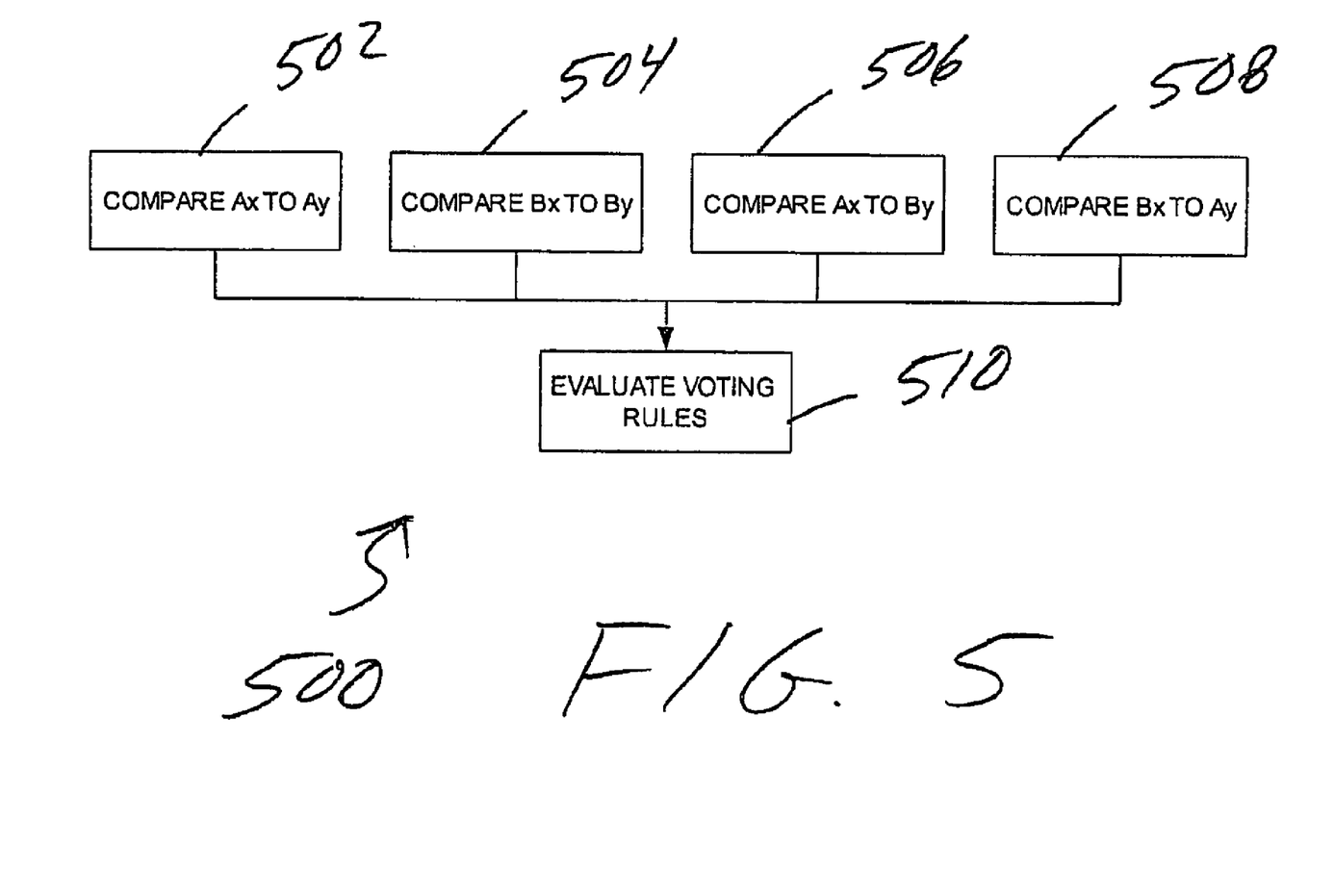
FIG. 5 is a flow diagram of one embodiment of a method of voting using data received on multiple channels.

FIG. 5 is a flow diagram of one embodiment of a method 500 of voting using data received on channels Ax, Ay, Bx, and By. Although the embodiments of method 500 shown in FIG. 5 is described as being implemented using the communication network 100 of FIG. 1 and a node 102 of FIG. 2, it is to be understood that other embodiments of method 500 are implemented in other ways. Method 500, in such an embodiment, is performed by voter 116. In the context of FIG. 5, the node 102 that is performing the processing of method 500 is referred to here as the "current node."

Method 500 comprises, after receiving data received on channels Ax, Ay, Bx, and By for a given time slot, comparing the data received on channel Ax to the data received on channel Ay (block 502), comparing the data received on channel Bx to the data received on channel By (block 504), comparing the data received on channel Ax to the data received on channel By (block 506), and comparing the data received on channel Bx to the data received on channel Ay (block 508). In one implementation of such an embodiment, each comparison is a bit-for-bit comparison of the entire two frames being compared. In another embodiment, each comparison compares a CRC included in each of the two frames being compared. One or more voting rules are evaluated using the results of the comparisons (block 510).

In the embodiment shown in FIG. 5, a four-bit vector (also referred to here as a "syndrome") is generated from the results of the four comparisons. The results of each comparison is stored in a respective bit of the syndrome, where the bit is set to a first value if the compared data is identical and where the bit is set to a second value if the compared data is not identical. Then, voting rules are evaluated to identify how to use the received data. For example, one embodiment of a truth table is set forth in Table 1 that illustrates one set of voting rules. In the truth table shown in Table 1, the value "T" represents that the associated comparison is true (that is, the data compared in the associated comparison is identical) and the value "F" represents that the associated comparison is false (that is, the data compared in the associated comparison is not identical). For a given input syndrome, the truth table shown in Table 1 indicates which data to use, from an integrity standpoint, and which data to use from an availability standpoint. In one embodiment, the results of evaluating the voting rules are supplied to the host 110 along with the data received from channels Ax, Ay, Bx, and By. In another embodiment, the voter 116 supplies a single frame, selected according to the voting rules, to the host 110 for use thereby (if the voting rules indicate that a frame suitable for use by the host 110 has been received). Also, in other embodiments, other voting rules are used.

TABLE 1

| Ax = Ay | Bx = By | Ax = By | Bx = Ay | Data to Use: (Integrity) | Data to Use: (Availability) |
| --- | --- | --- | --- | --- | --- |
| T | T | T | T | Any bus | Any bus |
| T | T | T | F | Ax or By | Ax or By |
| T | T | F | T | Bx or Ay | Bx or Ay |
| T | T | F | F | Uncorrectable Error | Any bus |
| T | F | T | T | Ax or Ay | Ax or Ay |
| T | F | T | F | Uncorrectable Error | Ax |
| T | F | F | T | Uncorrectable Error | Ay |
| T | F | F | F | Uncorrectable Error | Ax or Ay |
| F | T | T | T | Bx or By | Bx or By |
| F | T | T | F | Uncorrectable Error | By |
| F | T | F | T | Uncorrectable Error | Bx |
| F | T | F | F | Uncorrectable Error | Bx or By |
| F | F | T | T | Uncorrectable Error | Any bus |
| F | F | T | F | Uncorrectable Error | Ax or By |
| F | F | F | T | Uncorrectable Error | Bx or Ay |
| F | F | F | F | Uncorrectable Error | Uncorrectable Error |

In other embodiments, other voting rules are used.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A node that communicates over a first channel, a second channel, a third channel, and a fourth channel, the node comprising:
   a first network interface to transmit data on the first and second channels and to receive data only from the third and fourth channels;
   a second network interface to transmit data on the third and fourth channels and to receive data only from the first and second channels;
   a first bus guardian that asserts a first bus guardian signal when the second network interface is allowed to transmit; and
   wherein the second network interface is not allowed to transmit unless the first bus guardian asserts the first bus guardian signal.

2. A node that communicates over a first channel, a second channel, a third channel, and a fourth channel, the node comprising:
   a first network interface to transmit data on the first and second channels and to receive data only from the third and fourth channels;
   a second network interface to transmit data on the third and fourth channels and to receive data only from the first and second channels;
   a first bus guardian that asserts a first bus guardian signal when the second network interface is allowed to transmit;
   a second bus guardian that asserts a second bus guardian signal when the first network interface is allowed to transmit; and
   wherein the first network interface is not allowed to transmit unless the second bus guardian asserts the second bus guardian signal; and
   wherein the second network interface is not allowed to transmit unless the first bus guardian asserts the first bus guardian signal.

3. A node that communicates over a first channel, a second channel, a third channel, and a fourth channel, the node comprising:
   a first network interface to transmit data on the first and second channels and to receive data only from the third and fourth channels;

a second network interface to transmit data on the third and fourth channels and to receive data only from the first and second channels;

a first bus guardian that asserts a first bus guardian signal when the second network interface is allowed to transmit; and wherein the second network interface is not allowed to transmit data on the third and fourth channels unless the first bus guardian asserts the first bus guardian signal.

4. A node that communicates over a first channel, a second channel, a third channel, and a fourth channel, the node comprising:

a first network interface to transmit data on the first and second channels and to receive data only from the third and fourth channels;

a second network interface to transmit data on the third and fourth channels and to receive data only from the first and second channels;

a first bus guardian that asserts a first bus guardian signal when the second network interface is allowed to transmit; and a second bus guardian that asserts a second bus guardian signal when the first network interface is allowed to transmit;

wherein the first network interface is not allowed to transmit data on the first and second channels unless the second bus guardian asserts the second bus guardian signal; and wherein the second network interface is not allowed to transmit data on the third and fourth channels unless the first bus guardian asserts the first bus guardian signal.

5. The node of claim 4, further comprising:

a first transmit driver that communicatively couples the first network interface to the first channel;

a second transmit driver that communicatively couples the first network interface to the second channel;

a third transmit driver that communicatively couples the second network interface to the third channel; and a fourth transmit driver that communicatively couples the second network interface to the fourth channel.

6. The node of claim 4, wherein the first network interface and the second network interface comprises first and second integrated circuits, respectively.

7. The node of claim 4, wherein the first and second bus guardians are included in the first and second network interfaces, respectively.

8. The node of claim 4, further comprising at least one clock source.

9. The node of claim 4, further comprising a first clock source communicatively coupled to the first network interface and the first bus guardian and a second clock source communicatively coupled to the second network interface and the second bus guardian.

10. The node of claim 9, wherein the first network interface is synchronized to a time base using the first clock source and data received from the third channel and the fourth channel for use by the first bus guardian in determining when the second network interface is allowed to transmit, and wherein the second network interface is synchronized to the time base using the second clock source and data received from the first channel and the second channel for use by the second bus guardian in determining when the first network interface is allowed to transmit.

11. The node of claim 4, further comprising a host on which an application is executed.

12. The node of claim 4, wherein the first and second bus guardians implement a media access scheme.

13. The node of claim 12, wherein the media access scheme comprises a time division multiple access scheme.

14. The node of claim 4, wherein the first and second network interfaces and the first and second bus guardians implement a time-triggered protocol.

15. The node of claim 4, wherein the node performs at least one comparison of at least two of data received from the first channel, data received from the second channel, data received from the third channel, and data received from the fourth channel and wherein the node evaluates at least one voting rule that is a function of the results of the at least one comparison.

16. A communication network comprising:

a plurality of nodes; and at least a first channel, a second channel, a third channel, and a fourth channel;

wherein each of the plurality of nodes includes:

a first network interface to transmit data on the first and second channels and to receive data only from the third and fourth channels;

a second network interface to transmit data on the third and fourth channels and to receive data only from the first and second channels;

a first bus guardian that asserts a first bus guardian signal when the second network interface is allowed to transmit; and wherein the second network interface of each node is not allowed to transmit data on the third and fourth channels unless the respective first bus guardian asserts the respective first bus guardian signal.

17. A communication network comprising:

a plurality of nodes;

at least a first channel, a second channel, a third channel, and a fourth channel, wherein each of the plurality of nodes includes:

a first network interface to transmit data on the first and second channels and to receive data only from the third and fourth channels;

a second network interface to transmit data on the third and fourth channels and to receive data only from the first and second channels;

a first bus guardian that asserts a first bus guardian signal when the second network interface is allowed to transmit;

a second bus guardian that asserts a second bus guardian signal when the first network interface is allowed to transmit;

wherein the first network interface of each node is not allowed to transmit data on the first and second channels unless the respective second bus guardian asserts the respective second bus guardian signal; and wherein the second network interface of each node is not allowed to transmit data on the third and fourth channels unless the respective first bus guardian asserts the respective first bus guardian signal.

18. The network of claim 17, wherein each of the plurality of nodes includes a first clock source communicatively coupled to the first network interface and the first bus guardian and a second clock source communicatively coupled to the second network interface and the second bus guardian.

19. The network of claim 18, wherein, for each of the plurality of nodes, the respective first network interface is synchronized to a time base using the respective first clock source and data received from the third channel and the fourth channel for use by the respective first bus guardian in determining when the respective second network interface is allowed to transmit and wherein the respective second network interface is synchronized to the time base using the respective second clock source and data received from the first channel and the second channel for use by the respective second bus guardian in determining when the respective first network interface is allowed to transmit.

20. A node comprising:

means for asserting the first bus guardian signal when a second network interface is allowed to transmit, wherein the second network interface is operable to transmit data on third and fourth channels and to receive data only from first and second channels;

means for asserting a second bus guardian signal when a first network interface is allowed to transmit, wherein the first network interface is operable to transmit data on the first and second channels and to receive data only from the third and fourth channels;

means for not allowing the first network interface included in the node to transmit unless the second bus guardian signal is asserted; and means for not allowing the second network interface included in the node to transmit unless the first bus guardian signal is asserted.

* * * * *